Dec. 6, 1960  J. W. KRYSTOSEK  2,963,073
FILM SPLICER AND METHOD
Filed April 23, 1954
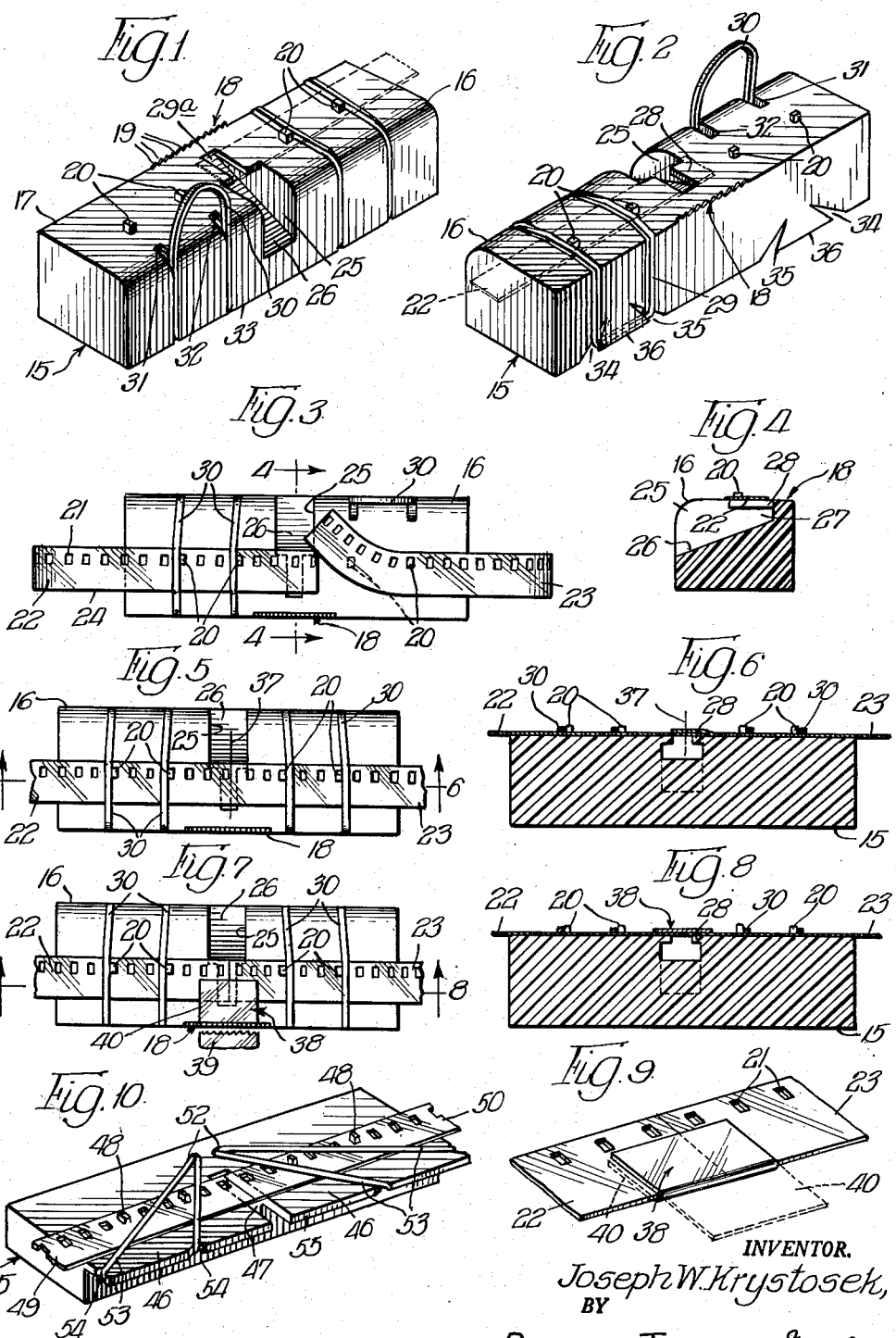
INVENTOR.
Joseph W. Krystosek,
BY
Dawson, Tilton & Graham
ATTYS United States Patent Office 2,963,073
Patented Dec. 6, 1960

2,963,073

FILM SPLICER AND METHOD

Joseph W. Krystosek, 303 S. Main St., Lombard, Ill.

Filed Apr. 23, 1954, Ser. No. 425,215

4 Claims. (Cl. 154—42.3)

This invention relates to a method and a structure for splicing or joining strip material, and more particularly to a method and structure especially suited for splicing motion picture film because of the fine joint it provides. While especially suited for this use, it will be apparent that it is also useful in other environments.

There are a number of reasons why it is desirable to provide a ready means for splicing film strip. For example, it happens occasionally that the film is broken and it then becomes necessary to splice the broken end portions thereof. Again, it is customary for those who take and show motion pictures to edit the film strip and in this case portions of the film may be deleted and in some cases it may be desirable to insert sections of the film at selected points along the film strip. For these reasons film splicers are known and are available commercially at most photography stores.

In one type of film splicer now widely used the free end portions of the film strip are severed along lines that should be substantially parallel and the end portions thereof are brought into abutting relation so that the strips are in axial alignment. The end portions of the strips are then anchored in this position and a cement or adhesive is placed along the abutting ends of the film strips. A period of time is then allowed for the cement to set; for example, fifteen to twenty minutes; and if everything has progressed satisfactorily the ends of the film strips are then spliced together. This procedure has not proved completely satisfactory, for it is very difficult to properly align and abut the end portions of the film strips and to apply the cement properly. Even where the preparation is carried out with extreme care the resulting joint is not strong and unless the film strip is handled carefully there is considerable tendency for the splice or joint to break.

Efforts along other lines with the purpose of providing a strong and accurate splicing of the end portions of film strips have been carried out. Tongue and slot connectors are an example of such efforts. These have not been satisfactory, for it is difficult to properly align the film strips axially and at the same time to both axially and longitudinally align and space the apertures that are provided along one longitudinal edge of the film strip. Accurate aligning of these apertures is important for they are used in drawing the film through a projector and receive the teeth of the drive sprocket. The film strip is generally relatively brittle and there is a tendency to crack the same if the tongue is bent rearwardly to provide an anchor. The resulting joint is not strong and the projections or protuberances frequently interfere with the free movement of the film through a projector.

It is accordingly an object of this invention to provide a method of splicing or joining strip material that is quick, easy, precise and which results in an excellent joint that is substantially as strong as the strip material at least where the material is a motion picture film. Another object of the invention is to provide a method of splicing film strip and the like in which a pressure-sensitive tape (preferably transparent) is secured to one surface of the strip in bridging relation with the end portions thereof which have been severed and brought into axial alignment and abutting relation, the tape then measured to a predetermined width and severed in a single operation and thereafter secured to the opposite surface of the film strip to bridge the abutting ends thereof.

Still another object is in the provision of a splicer structure equipped with means for axially aligning strip material and for anchoring the same in alignment; the structure being arranged to permit quick, easy and accurate severing of the anchored end portions of the strip material and being equipped with means for measuring and severing a tape used in bridging the abutting ends and in securing them together. A further object is in providing a structure as described above in which the splicer is adapted for use in splicing film strip and is equipped with means for aligning both axially and longitudinally in the necessary relationship the apertures provided by the film strip; the means for anchoring the film strip being readily secured and providing a firm, positive anchor but being releasable with a slight flick of the finger. Additional objects and advantages will appear as the specification proceeds.

Embodiments of the invention are illustrated in the accompanying drawing, in which—

Figure 1 is a perspective view of a splicer structure embodying my invention; Fig. 2 is a perspective view of the structure illustrated in Fig. 1 but showing the opposite side thereof; Fig. 3 is a top plan view of the splicer structure and which shows one step in the method of splicing film strip; Fig. 4 is a transverse sectional view taken on the line 4—4 of Fig. 3; Fig. 5 is a top plan view of the splicer structure and it shows a subsequent step in the method of joining the film strip; Fig. 6 is a longitudinal sectional view taken on the line 6—6 of Fig. 5; Fig. 7 is a top plan view of the structure and it shows a further step in the method of joining the film strip; Fig. 8 is a longitudinal sectional view taken on the line 8—8 of Fig. 7; Fig. 9 is a broken perspective view showing the film strip after the splicing thereof has been completed; and Fig. 10 is a perspective view showing a modified form of the splicer structure.

Referring now to Figs. 1 and 2 in particular, it will be seen that the form of the splicer structure illustrated has been designated generally with the numeral 15. The splicer 15 consists essentially of a rectangular block that is preferably provided with an arcuate or rounded longitudinal edge portion 16. The splicer 15 may be formed from any suitable material and, for example, may be made from wood, metal or plastic. Preferably the splicer is formed from plastic and may be molded in a single operation in the configuration illustrated in Figs. 1 and 2.

Intermediate the ends of the splicer structure 15 and along the longitudinal edge 17 thereof a severing means 18 is provided. The severing means 18 may be a knife edge that is formed integrally with the block 15 or which may be secured thereto by any suitable means, but preferably comprises a plurality of serrations 19 which are formed integrally with the structure and as part of the molding operation. The serrated severing edge 18 is useful in cutting a strip of pressure-sensitive tape in a manner that will be hereinafter described.

Spaced between the longitudinal edges 16 and 17 of the structure 15 are a plurality of upwardly-extending teeth or posts 20. The posts 20 are in axial alignment along the upper surface of the structure 15 and are spaced a apart by a distance that enables the posts to be received within the apertures 21 provided by the film strips 22 and 23 as shown in Fig. 3. The spacing between the posts 20 and the longitudinal edge 17 is critical, for reasons that will be subsequently described, and this distance is equal to twice the width of the film strip between the apertures 21 and the longitudinal edge 24 of the film strips. The edge portion 24 is most remote from the apertures 21 of the two longitudinal edges provided by the film strips.

The structure 15 is provided with an enlarged recess 25 that is oriented at substantially the mid-portion of the serrated knife edge 18. The recess 25 is equipped with a downwardly and outwardly inclined bottom wall 26 as is shown best in Figs. 1 and 4. The recess 25 undercuts a portion of the upper surface of the structure 15 and the undercut portion is designated with the numeral 27. As a result of this undercutting a shelf or ledge 28 is provided by the upper surface of the structure 15. As is shown best in Figs. 1 and 2, the shelf 28 is provided centrally with a slot 29a that if desired may be slightly smaller and preferably is smaller than the width of the recess 25. The recess 25 and slot 29a are important in severing the end portions of the film strips 22 and 23 as is shown in Fig. 5 and are adapted to permit the free entry, manipulation and removal of a pair of scissors.

It is desirable to provide some means for anchoring or securing the film strips 22 and 23 upon the surface of the structure 15 and with the apertures 21 or certain ones thereof receiving the posts 20. While the precise means mary vary considerably depending upon preference, I have found that a pair of rubber bands or elastic members 29 and 30, one adjacent each end of the structure 15, are particularly suited for anchoring the film strips in position. To permit use of the elastic bands 29 and 30 I equip the structure 15 adjacent each end portion thereof with a pair of spaced-apart substantially parallel slots or elongated recesses 31 and 32. The recesses 31 and 32 extend downwardly to the bottom longitudinal edge portion 33 of the structure 15 and if desired the bottom surface of the structure may be recessed or grooved so as to receive and hold the end portion of the band 30 and band 29 therein.

As is shown best in Fig. 2, I desire to draw each of the bands 29 and 30 over the top surface of the structure 15 and over the film strips 22 and 23 which may be positioned on top of the splicer structure. Thereafter it is desirable to anchor the bands or to secure the free end portions thereof so that the film strips are held firmly on top of the splicer structure 15. Any number of means may be employed to anchor the end portion of each of the resilient bands. I prefer, however, to provide means as illustrated in Fig. 2. In that figure it is seen that I provide for each of the bands 29 and 30 a pair of inwardly and upwardly inclined recesses 34 and 35. The recesses are spaced apart and provide therebetween a tongue 36 about which the end portion of the bands may be secured. In Fig. 2 the resilient band 29 is shown in position about the tongue 36, while the band 30 has not as yet been drawn over the top of the splicer structure nor secured about the tongue 36 that is intended for that band.

In the operation of the structure described, and in the method of joining the end portions of strip material together, a pair of strips 22 and 23 which may comprise a part of a motion picture film are placed on the upper surface of the structure 15 and with the posts 20 received within selected apertures 21. In the illustration of Fig. 3 the strip 22 is in position and the band 29 is drawn over the top of the film strip to anchor it securely in position upon the structure 15. The strip 23 is shown in the process of being placed upon the surface of the structure 15 and one post 20 is received within an aperture 21 while the remaining post 20 has not as yet been positioned within an aperture.

After both of the strips 22 and 23 have been placed upon the upper surface of the structure 15 and the resilient bands 29 and 30 secured about the tongues 36, the film strips are conditioned as shown in Fig. 5 and also in Fig. 6 with the end portions thereof overlapping each other. After this positioning the end portions of the film strip are severed along the line 37 shown in Figs. 5 and 6. I have found that the most desirable means for severing the film strips along the line 37 is to insert the tip of a pair of scissors into the recess 25 and slot 29a and to thereafter snip the overlapping end portions of the film strip. Scissors are particularly suited, for they readily cut the material from which film strips are formed. Because the end portions of the film strips are in overlapping relation, a single cut with a pair of scissors provides transverse edges for each of the film strips that are parallel and which are in abutting relation over the slot 29a.

In the next operation a strip of tape 38 which may be drawn from a parent roll 39 is secured to the upper surface of the film strips 22 and 23 in bridging relation across the abutting end portions thereof. Preferably the tape 38 has a pressure-sensitive adhesive on one side thereof so that by placing the tape upon the surface of the film strips and pressing the tape downwardly it is firmly secured to the film strips. It is also desirable that the tape be transparent and as an example of a tape that may be used and which I have found to be particularly suited, reference may be made to the pressure-sensitive transparent tape that is available at all commercial outlets under the brand name Scotch tape.

After the tape 38 has been secured in position as shown in Figs. 7 and 8, the tape strip is severed from the parent roll 39 by tearing the tape across the serrated cutting edge 18 provided along the longitudinal edge 17 of the splicer structure.

In the subsequent operations the elastic bands 29 and 30 are released from the tongues 36 in any suitable manner. With the slots 34 and 35 and tongues 36 provided therebetween I have found that by simply flicking the end portion of the resilient bands upwardly, that they immediately release from the tongue. The film strips 22 and 23 are then lifted from the upper surface of the splicer structure 15 and in this operation the edge portion 40 of the tape strip 38 which overhangs the abutting film strips 22 and 23 may be peeled from the surface of the structure 15. Thereafter this overhanging portion 40 is folded under and is pressed against the under surface of the strips 22 and 23 in bridging relation with the end portions thereof. The resulting structure, then, comprises a pair of film strips 22 and 23 having end portions that are brought into abutting relation and which end portions are bridged by a pressure-sensitive tape 38 which is secured to each side of the film strips.

It should be noted that the edge portions of the tape 38 do not extend over the apertures 21 that are provided by the film strips. Rather, the edge portions of the tape extend substantially to the apertures. It is necessary to permit the apertures 21 to remain free and open so that the teeth of a drive sprocket can enter the same when the film strip is drawn through a projector.

It has been mentioned hereinbefore that the spacing between the longitudinal edge portion 17 and particularly the serrated cutting edge 18 provided thereby and the posts 20 or apertures 21 is critical. The reason for this is that it is desired to measure and sever the tape strip 38 so that it will have the proper dimensions such that the overhanging portion 40 thereof can be folded under the strips 22 and 23 and secured thereto in substantially an automatic movement while there will be no danger that the tape will extend over the apertures 21 through the film strip. Thus by placing the tape 38 adjacent but not over the apertures 21 and securing it to the upper surface of the film strips and thereafter severing the tape on the serrated cutting edge 18, the overhanging portion 40 is simply folded under and secured to the film strips and always the apertures 21 will remain free and open.

A modified form of the invention is shown in Fig. 10. In this embodiment the splicer structure is designated generally with the numeral 45. The structure 45 is generally similar to the splicer structure 15 heretofore described. Specifically, it is equipped along one longitudinal edge portion thereof with an outwardly-extending shelf or ledge 46 and centrally both the ledge 46 and the center portion of the structure are equipped with a transversely-extending slot or recess 47. Intermediate the longitudinal edges of the structure 45 the upper surface thereof has projecting therefrom a plurality of spaced-apart posts 48 which are similar in structure and in purpose to the posts 20 heretofore described. A pair of film strips 49 and 50 are adapted to be received upon the upper surface of the structure 45 with the apertures 51 provided by the film strips receiving the posts 48.

In order to secure the film strips in position upon the surface of the structure 45, a resilient band which may be a rubber band is threaded through the openings 52 adjacent the rear edge of the block 45. The end portions of the resilient band which is designated with the numeral 53 are adapted to be drawn over the corner portions of the ledge 46 and to be anchored in this position by the notches or recesses 54.

This structure is used in substantially the same manner as the splicer structure shown in Figs. 1 and 2 and the method of joining the end portions of strip material is substantially identical. After the film strips 49 and 50 are secured in place by the resilient band 53, a pair of scissors may be inserted into the recess 47 and the overlapping end portions of the film strips severed. A pressure-sensitive tape is then placed on the upper surface of the film strips so as to bridge the end portions thereof and the tape strip is severed from the parent roll along the outer longitudinal edge 55 of the shelf 46. Again, the spacing between the edge 55 and the posts 48 is critical for it is desired upon severing a tape strip from the parent roll to provide an overhanging portion that can be folded under the film strips and secured thereto so that the apertures 51 through the film strips are not covered or otherwise obstructed by the tape.

It will be apparent that the method and the structure disclosed is suitable for securing the end portions of strip material irrespective of the width of the strip of material. Specifically, it may be used for splicing motion picture film, for example, 8 millimeter film strips or loops, or other similar strip material with or without apertures or other devices along a longitudinal edge thereof that must not be covered or otherwise obstructed. In all events, the spacing between the posts and the cutting edge will be twice the distance between the apertures through the film strip and the longitudinal edge thereof most remote from these apertures. While the invention in particularly suited for splicing 8 millimeter film, it may be used also, with slight modification, for splicing 16 and 32 millimeter film.

The joint or splice formed in accordance with this invention has been found to be as strong and stronger than the film strip itself. The film strip may be snapped in an effort to break the splice or bond and it has been found that the film strip itself will crack and break before the splice can be broken. The pressure-sensitive tape is relatively thin and has a substantially smaller width or thickness than does the film strip. In showing a film spliced in accordance with this invention it has been found that the splice or joint causes no greater distortion of the picture than does a film splice formed by cement in a manner described at the beginning of this specification. It is substantially a better splice than where a tongue and slot are provided, for there are no obstructions that interfere with the free movement of the film strip through the film track.

While in the foregoing specification embodiments of the invention have been set out in considerable detail both as to structure and method for purposes of illustration, it will be apparent to those skilled in the art that numerous changes may be made in these details without departing from the spirit and principles of the invention.

I claim:

1. In a structure of the character described, an elongated block equipped along one longitudinal edge thereof with means for severing a tape strip, said block having a plurality of spaced apart, longitudinally aligned posts extending along a face thereof at a predetermined distance from said means, said block being provided with an enlarged recess having an axis thereof generally normal to said means and being of a size sufficient to receive at least the cutting edge of a pair of scissors therein, and resilient means carried by said block for securing a film strip thereon in longitudinally extending relation with respect thereto and across said recess with the sprocket openings in the film strip receiving said posts therein.

2. The structure of claim 1 in which said block is equipped with a slotted shelf overhanging a portion of said recess for aligning the end of a pair of scissors centrally within said recess.

3. The structure of claim 1 in which the aforesaid predetermined distance spacing said posts from said severing means is substantially twice the distance between the sprocket openings in such film strip and the longitudinal edge thereof most remote from the openings so that a tape strip having one end thereof secured to said film strip adjacent said posts, may be severed at the precise length enabling a portion thereof to be folded under and secured to such film strip without covering the openings therein and with the severed end of the tape strip being in substantial alignment with the end thereof adjacent said posts.

4. The structure of claim 1 in which said last mentioned means comprises a pair of resilient bands anchored at one end thereof to said block, and in which said block is provided with means for releasably securing the opposite end portions of said bands thereto with the bands in extended relation across the face of the block in spanning relation with certain of said posts.

References Cited in the file of this patent

UNITED STATES PATENTS

| | | |
|---|---|---|
| 1,383,726 | Kiracofe | July 5, 1921 |
| 2,430,630 | Davis | Nov. 11, 1947 |
| 2,446,576 | De Vry | Aug. 10, 1948 |
| 2,499,686 | Selmin | Mar. 7, 1950 |
| 2,544,082 | Hancock et al. | Mar. 6, 1951 |
| 2,552,148 | Carson | May 8, 1951 |
| 2,565,009 | Wallingsford | Aug. 21, 1951 |